Sept. 9, 1941.  O. HOFER  2,255,056
DEVICE FOR REMOVING STATIC ELECTRICITY FROM PAPER WHILE BEING PRINTED
Filed May 20, 1940
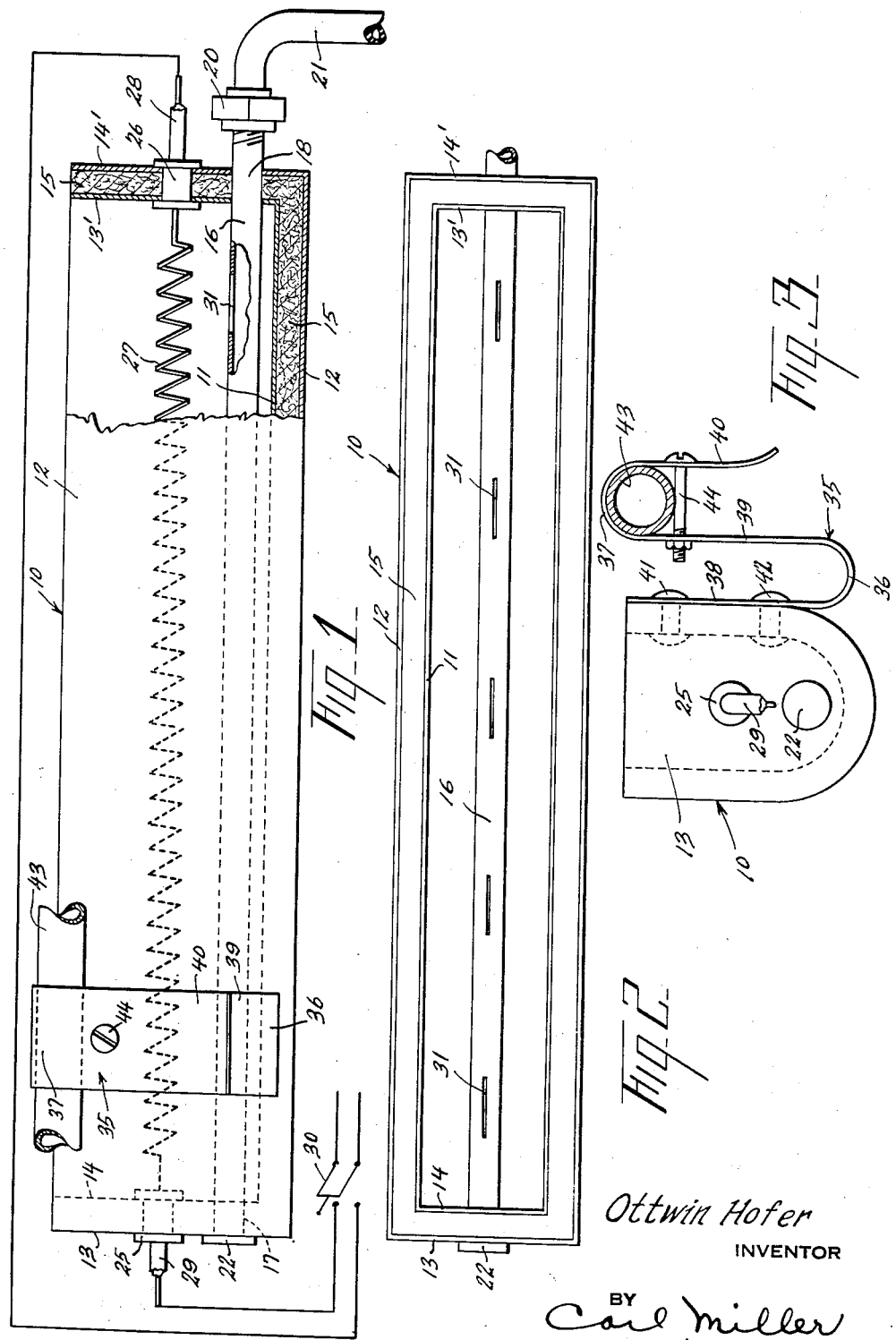
Ottwin Hofer
INVENTOR
BY Carl Miller
ATTORNEY Patented Sept. 9, 1941

2,255,056

UNITED STATES PATENT OFFICE 2,255,056

DEVICE FOR REMOVING STATIC ELECTRICITY FROM PAPER WHILE BEING PRINTED

Ottwin Hofer, Lennox City, S. Dak.

Application May 20, 1940, Serial No. 336,232

5 Claims. (Cl. 219—39)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a device for removing static electricity from paper while being printed.

The object of this invention is to provide a heater containing a heating element and a blower member disposed behind the heating element adopted to blow heated air against the paper as it is being printed, the heater including suitable attaching means for mounting the same on an appropriate part of the printing press.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figure 1 is an elevational view of the heater partly in section showing details of construction.

Figure 2 is a plan view of the heater with the heating element removed.

Figure 3 is an end elevational view of the heater showing manner of mounting the same.

Referring to the drawing in detail, 10 denotes the heater which comprises an elongated sheet metal housing, U-shaped in transverse section and formed of an inner U-shaped metal wall 11 and an outer U-shaped metal wall 12 arranged in spaced relation to each other, both said walls being respectively provided with similarly spaced metal end walls 13, 14 and 13', 14'. Filling the spaces between the inner and outer walls is a layer of any suitable insulating material 15, such for example as asbestos fibre, and retained in said spaces in any desired manner (not shown).

Arranged within the heater 10 in the central longitudinal plane thereof and adjacent the bottom of the inner wall 11 is a blower tube or pipe 16, one end portion 17 of which extends through and is supported by the end walls 13, 14 and the other end portion 18 of which similarly extends through and is supported by the end walls 13', 14', said end portion 18 projecting beyond the outer end wall 14'. The end portion 18 is threaded for attachment to a coupling 20 connecting a pipe 21 to the blower tube 16, the pipe 21 being connected to a source of air under pressure (not shown). On the end portion 17 of the blower tube 16 there is provided a stop 22 in the form of a closure cap or plug which functions not only to close the end of the blower tube 16 but also to prevent axial movement of the blower tube in one direction, the coupling 20 preventing axial movement in the other direction beyond a certain point depending upon the distance the same is from the outer end wall 14', so that the blower tube 16 is fixed to all intents and purposes to the heater against accidental removal therefrom. Preferably the coupling 20 should be located substantially in abutment to the end wall 14'. As shown in Figure 1, the blower tube 16 is parallel to the bottom of the heater 10.

Fitted within the end walls 13, 14 and 13', 14' in coaxial parallel relation to the blower tube 16 and preferably in the same longitudinal center plane therewith are insulator sleeves 25 and 26, each of which supports an end of an electric heating coil 27. The end of the coil 27 supported by the insulator 26 is connected to a conductor 28, while the end of the coil 27 supported by the insulator 25 is connected to a conductor 29, both said conductors being attached to the terminals of a switch 30 for connection to a source of electrical supply. When the switch 30 is closed, the circuit is closed to cause the heating coil 27 to become functionally operative, in the manner well known.

The blower tube 16 is proided on its face opposite the heating coil 27 with a row of spaced narrow slots or openings 31, through which air is discharged upwardly across the heating coil 27 to become heated thereby, the heated air being blown on the paper being printed.

In order to mount the heater 10 on the printing press in operative relation to the paper being printed, the heater is provided with a pair of brackets 35 arranged one adjacent each end thereof, (only one being shown). The brackets 35 are formed of strap iron, bent to provide opposed loops 36 and 37, an attaching leg 38, and clamping legs 39 and 40, see Figure 3. The attaching leg 38 is rigidly secured to a side wall of the heater 10 by rivets or bolts 41, 42. The heater 10 may thus be hung on any suitable part of the printing press, in either the position shown in Figure 3, or in an inverted position by placement of the supporting part of the press between the legs 38 and 39. In the position shown in Figure 3, the clamping legs 39 and 40 of the bracket 35 straddle a pipe 43 forming a part of or attached to the printing press, the pipe 43 being seated in the loop 37. A clamping bolt 44 connects the clamping legs 39 and 40 to securely attach the bracket 35 to the pipe support 43.

It will be further understood that this invention relates not only to a device for removing static electricity from paper while being printed, but also serves to dry and eliminate offsets, thus making it possible to print the other side of the printed sheet immediately.

Having thus described the invention, what is claimed is:

1. In a device of the character described, a heater comprising a housing having opposed end walls and open at one side, a blower tube supported by said end walls within said housing in spaced relation to the bottom thereof, a heating element within said housing arranged in parallel spaced relation to said blower tube, and spaced means in said blower tube permitting a discharge of air directed across said heating element outwardly through the open side of said housing.

2. In a device of the character described, a heater comprising a housing having opposed end walls and open at one side, a blower tube supported within said housing in spaced relation to the bottom thereof and connected to a source of air pressure, an electrically operated heating element, located within said housing and arranged in parallel spaced relation to said blower tube, and longitudinally spaced means in said blower tube permitting a discharge of air directed across said heating element outwardly through the open side of said housing.

3. In a device of the character described, a heater comprising a trough-shaped housing having opposed end walls and open at one side and including spaced inner and outer metallic walls, insulating material filling the space between said walls, a blower tube supported by the end walls of said housing arranged adjacent to and parallel to the base of said trough-shaped housing and connected to a source of air pressure, a plurality of openings provided along the outwardly directed side of said blower tube, and an electric heating element bridging said end walls and arranged in spaced parallel relation to said blower tube adapted to heat the air discharged through the openings of said blower tube.

4. In a device of the character described, a heater comprising a trough-shaped housing having opposed end walls and open at one side and including spaced inner and outer metallic walls, insulating material filling the space between said walls, a blower tube supported by the end walls of said housing arranged adjacent to and parallel to the base of said trough-shaped housing and connected to a source of air pressure, a plurality of longitudinally spaced openings provided in said blower tube, and an electric heating element bridging said end walls arranged in spaced parallel relation to said blower tube whereby to heat the air discharged through said openings, said end walls being each provided with an insulation sleeve adopted to receive and support an end of said electric heating element, both said blower tube and electric heating element being arranged in the vertical longitudinal center plane of said trough-shaped housing.

5. In a device of the character described, a heater comprising a trough-shaped housing having opposed end walls and open at one side and including spaced inner and outer metallic walls, insulating material filling the space between said walls, a blower tube supported by the end walls of said housing arranged adjacent to and parallel to the base of said trough-shaped housing and connected to a source of air pressure, a plurality of longitudinally spaced aligned slotted openings provided along the upper side of said blower tube, and an electric heating element bridging said end walls arranged in spaced parallel relation to said blower tube and in opposed relation to the openings therein whereby to heat the air discharged through said openings, said end walls being each provided with an insulation sleeve adapted to receive and support an end of said electric heating element, both said blower tube and electric heating element being arranged in the vertical longitudinal center plane of said trough-shaped housing, and bracket means attached to a side wall of said trough-shaped housing for mounting said heater to a support.

OTTWIN HOFER.